A. J. BENNETT.
LEMON SQUEEZER.
APPLICATION FILED APR. 1, 1909.
922,449.
Patented May 25, 1909.
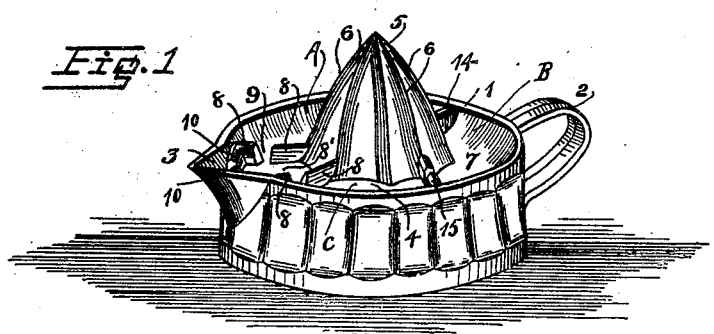
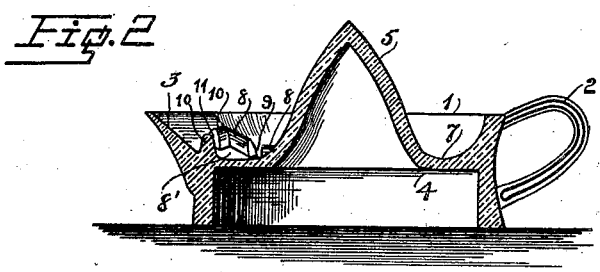
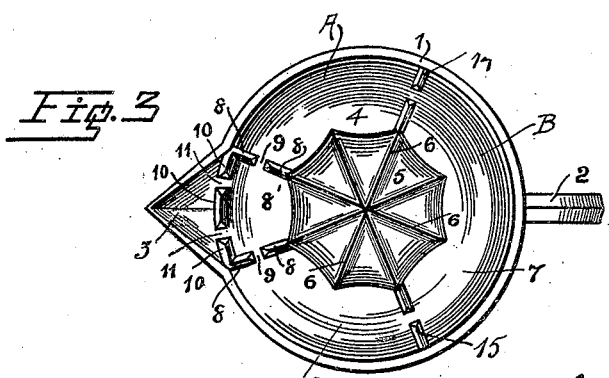

UNITED STATES PATENT OFFICE.

ARTHUR J. BENNETT, OF CAMBRIDGE, OHIO.

LEMON-SQUEEZER.

No. 922,449.      Specification of Letters Patent.      Patented May 25, 1909.

Application filed April 1, 1909. Serial No. 487,180.

*To all whom it may concern:*

Be it known that I, ARTHUR J. BENNETT, a citizen of the United States, residing at Cambridge, in the county of Guernsey and State of Ohio, have invented certain new and useful Improvements in Lemon-Squeezers, of which the following is a specification.

This invention relates to improvements in lemon squeezers, and pertains more particularly to an improvement on the article forming the subject matter of patent granted to me on February 16, 1909, No. 912443.

In my prior patent above identified, I have found, in actual use, that during the expressing operation, seeds freed from the lemon will enter the space between the two dams and consequently will not be held in restraint during the pouring of the accumulated juice into the receiving vessel or receptacle.
The present improvement is therefore aimed particularly to overcome the objection above pointed out, in a manner later specified, and has still further objects which will be hereinafter more fully pointed out.
In the drawings:—Figure 1, is a view in perspective of the improved article. Fig. 2, is a vertical sectional view of Fig. 1, and Fig. 3 is a top plan view of Fig. 1.

The article as improved, includes an annular rim 1, formed with a handle 2, and a pouring or discharge mouth 3, there being a partition 4, midway of the height of the rim. A cone 5, formed with ribs 6, is made integral with partition 4, and forms in conjunction with rim 1, a channel 7. The channel 7, at the point where the pouring mouth communicates therewith is formed with a depressed deepened well or part 8', to facilitate the pouring of the accumulated lemon juice and to further assist in perfect draining of the channel during the pouring operation.

Extending across the channel 7, are two dams which are arranged on opposite sides of the pouring mouth 3 and which are divergently related, each dam being composed of a pair of vertical lugs 8 which have their outer ends contacting with the rim 1, and the cone 5, and have a V-shaped space 9 between their inner ends. Each lug has its opposite sides beveled, to form a sharp top cutting edge, so as to assist the ribs 6, of cone 5, in performing their function during the expressing of the lemon. The purpose and function of the dams is to engage and hold in restraint any seeds which may have accumulated in the channel 7, during the process of expressing, at the time the lemon juice is being poured from the discharge mouth 3. The juice readily passes through the space 9, between the broken dams, and since said space is V-shaped being widest at the top, the juice can easily flow over or past any seed or seeds which may have lodged in said space of the broken dams. It will be further observed that during the act of expressing the evident tendency of the broken dams is to catch the seeds in the V-shaped space thereof so as to prevent same from entering the depression or well 8' which lies directly to the rear of pouring mouth 3.

The parts above described and depicted in the drawings are present in my prior patent. In my improvement however, I utilize a third dam which is composed of three vertically extending lugs 10, the outer ones of which are disposed at substantially right angles to the adjacent lugs 8, practically constituting continuations of the latter as observed in Figs. 1 and 3 of the drawings. The lugs 10, are separated by V-shaped spaces 11, and are disposed so that their top edges project above the top edges of the lugs 8, the purpose and function of which will be later set forth.

The present article differs from my prior patent in that lugs 8 and cone 5, are disposed so that the lugs form continuations of two of the ribs 6, of the cone, and further are so related that two of the lugs 8 are disposed directly at each side of the entrance of the pouring mouth 3, thus providing a more practical relationship of the parts wherein greater coöperating efficiency of the parts results than in my former invention. It will moreover, be seen that in the present article the three broken dams and the cone 5, form a complete inclosure for the well 8', thus providing added means for excluding the seeds from the pouring mouth whereby should seeds succeed in passing the dams constituted of the lugs 8, they will, during the pouring step, be prevented from entering mouth 3, due to the presence of the dam constituted of lugs 10. Since lugs 10, are of greater height than lugs 8, it will be evident that seeds contained in the well 8', will be reliably held against ingress into mouth 3. During the expressing operation, it will be manifest that the major portion of the seeds will enter channel 7, while but a small portion, if any, will enter well 8'. In still further addition, I employ dams 14 and 15, each composed of a pair of lugs identical in character with lugs 8, above described, but located on opposite sides of handle 2, thereby providing the channel with four wells, designated A, B, C, and 8'. Thus, regardless of the number of seeds the lemon may possess, ample assurance is given of their being reliably trapped in the four wells, whereas should there be but one well, any large quantity of seeds would succeed in passing the barriers which control the entrance to the pouring mouth, as is obvious. When the body is tilted to drain the channel of the accumulated juice some of the seeds will be trapped in each of the wells A, B, C, and 8', while such seeds as may have entered well 8' will be encountered by and held from entering the pouring mouth by the lugs 10. Should any seeds pass the dams which extend transversely to channel 7, the auxiliary barrier afforded by lugs 10 will lie in their path, and thus effectually restrain the seeds from entering mouth 3. Further it will be manifest that well 8' has two inlets provided by the broken dams formed by lugs 8, and an outlet provided by the broken dam formed by lugs 10. Thus well 8' is inclosed on four sides, one constituted by cone 5, and the remaining three by the broken dams above referred to.

What is claimed is:

1. A lemon squeezer including a body, formed with a channel and a pouring mouth which communicates therewith, a ribbed cone arranged to form one wall of the channel, and a plurality of broken dams which lead from the cone to extend transversely across the channel, and a broken dam which extends across the pouring mouth at the juncture of the channel and pouring mouth, whereby said cone and said dams constitute a series of wells for trapping the seeds.

2. A lemon squeezer including a body formed with a channel and a pouring mouth which communicates therewith, a ribbed cone arranged to form one wall of the channel, a pair of main broken dams extending across the channel, said dams being in alinement with and forming continuations of two of the ribs of the cone, and extending on opposite sides of the pouring mouth entrance, and a third broken dam of greater height than the first named dams extending across the entrance to the pouring mouth to contact with the outer ends of the first named dams, whereby an auxiliary seed trap, having two inlets and an outlet, is formed at the pouring mouth entrance.

3. A lemon squeezer including a body formed with a ribbed cone having a channel surrounding the same with a pouring mouth leading into the channel, a pair of broken dams which extend from said cone across the channel and a third broken dam which extends across the pouring mouth at the juncture thereof with the channel, and which constitutes an auxiliary dam, said auxiliary dam being of greater height than said main dams.

4. A lemon squeezer including a body formed with a ribbed cone having a channel surrounding the same with a pouring mouth leading into the channel, a pair of dams extending from said cone to opposite sides of the channel, and a third dam which extends across said pouring mouth at the entrance thereof to constitute an auxiliary dam to trap any seeds which may have passed either of said main dams, or which may, during the expressing operation, fall in the space between the main dams at the pouring mouth.

5. A lemon squeezer including a body formed with a ribbed cone having a channel surrounding the same with a pouring mouth leading into the channel, a plurality of dams which extend across said channel and divide the same into a plurality of wells, and a dam which extends across the pouring mouth.

6. A lemon squeezer including a body having a channel and a pouring mouth which leads thereto, a plurality of dams which traverse the channel and coöperate to form a series of interconnected wells, and a dam which extends across the pouring mouth and forms one wall of one of said wells.

In testimony whereof I affix my signature in presence of two witnesses.

ARTHUR J. BENNETT.

Witnesses:
CHAS. S. TURNBAUGH,
MARGARET MAFFETT.